United States Patent
Mima et al.

(10) Patent No.: US 8,749,734 B2
(45) Date of Patent: Jun. 10, 2014

(54) LIQUID CRYSTAL DISPLAY DEVICE WITH LAYERS OF DIFFERENT COLOR FILTERS COVERING LIGHT SHIELDING FILMS

(75) Inventors: Toshiyuki Mima, Chiba (JP);
Yasumitsu Fujita, Chiba (JP);
Toshiyuki Koshita, Chosei (JP)

(73) Assignees: Japan Display Inc., Tokyo (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 1267 days.

(21) Appl. No.: 12/506,437

(22) Filed: Jul. 21, 2009

(65) Prior Publication Data
US 2010/0020275 A1    Jan. 28, 2010

(30) Foreign Application Priority Data
Jul. 23, 2008   (JP) .................................. 2008-189604

(51) Int. Cl.
*G02F 1/1335*   (2006.01)
*G02F 1/1362*   (2006.01)

(52) U.S. Cl.
USPC ................................ 349/106; 349/110; 430/7

(58) Field of Classification Search
CPC .................... G02F 1/133512; G02F 1/133514; G02F 2001/136222
USPC ...................... 349/106, 110; 430/7
See application file for complete search history.

(56) References Cited

U.S. PATENT DOCUMENTS

| 4,758,734 A | * | 7/1988 | Uchida et al. | ............... 250/208.1 |
| 4,846,556 A | * | 7/1989 | Haneda | ......................... 359/891 |
| 5,042,920 A | * | 8/1991 | Yoshino et al. | ............... 349/106 |

FOREIGN PATENT DOCUMENTS

JP   2003-131020   5/2003

* cited by examiner

*Primary Examiner* — Huyen Ngo
(74) *Attorney, Agent, or Firm* — Antonelli, Terry, Stout & Kraus, LLP.

(57) ABSTRACT

Unevenness due to the influence of a mesh when a sealing material for bonding a TFT substrate and a counter substrate together is formed on the counter substrate by screen printing is prevented. Light shielding films are extended in the horizontal direction and arranged in the vertical direction. Red color filters, blue color filters, and green color filters are extended in the vertical direction at predetermined intervals. The blue color filters are extended also in the horizontal direction so as to cover the light shielding films. In a cross section along the red color filter and the green color filter, the level of a portion above the light shielding film is higher compared with that of the other portion by the thicknesses of the blue color filter and the light shielding film. In screen printing, since the high portion serves as a stopper for the mesh, the occurrence of unevenness due to the mesh can be prevented.

6 Claims, 10 Drawing Sheets

LIQUID CRYSTAL DISPLAY DEVICE WITH LAYERS OF DIFFERENT COLOR FILTERS COVERING LIGHT SHIELDING FILMS

CLAIM OF PRIORITY

The present invention claims priority from Japanese application serial No. 2008-189604, filed on Jul. 23, 2008, the content of which is hereby incorporated by reference into this application.

BACKGROUND OF THE INVENTION

1. Field of the Invention

The present invention relates to a display device and more particularly to a liquid crystal display device in which the occurrence of unevenness in a display region is suppressed when a sealing material is formed by printing.

2. Background Art

In liquid crystal display devices, a TFT substrate at which pixel electrodes, thin film transistors (TFTs), and the like are formed in a matrix shape and a counter substrate which faces the TFT substrate and at which color filters and the like are formed at locations corresponding to the pixel electrodes of the TFT substrate are arranged, and liquid crystal is interposed between the TFT substrate and the counter substrate. Optical transmittance due to liquid crystal molecules is controlled for each pixel to form an image.

Light shielding films are formed at the counter substrate together with the color filters. The light shielding film is filled between the color filters to improve the contrast of screen as well as serves as a light shielding film for preventing an external light from entering the TFT formed at the TFT substrate.

When the light shielding film formed of a resin overlaps part of the color filter, a convex which is partially increased in height in the overlapped portion is created. JP-A-2003-131020 discloses a manufacturing method for reducing the height of the convex which is partially increased in height by using so-called halftone exposure.

SUMMARY OF THE INVENTION

The liquid crystal display device is configured such that the TFT substrate and the counter substrate are bonded together via a sealing material formed on the periphery with liquid crystal sealed therein. The sealing material is generally formed at the counter substrate to bond the TFT substrate and the counter substrate together. The sealing material has heretofore been applied by using a dispenser.

It takes long to form a sealing material by using a dispenser. In the case of small liquid crystal display devices, numerous liquid crystal display devices are formed on a mother substrate, and thereafter, individual liquid crystal display devices are separated from the mother substrate. Even when numerous liquid crystal display devices are manufactured on a mother substrate, a sealing material has to be formed on the individual liquid crystal display devices. In such a case, it takes very long to form the sealing material by using a dispenser.

As measures against this situation, there is a method for forming a sealing material by screen printing. In screen printing, however, a mesh has to be brought into contact with an alignment film in a display region where color filters are formed. Therefore, there arises a problem that the trace of the mesh is transferred to the alignment film to cause unevenness on screen.

In order to solve the mesh unevenness, a method for increasing the number of lines of mesh, reducing the line diameter of mesh, and dispersing a pressure on the counter substrate has been developed, which is insufficient. A mesh can be subjected to a so-called calendaring treatment in which the mesh is rolled to be flat, which also cannot eliminate the unevenness sufficiently.

On the other hand, when a so-called suspended metal plate which is a thin stainless steel plate formed on the lower side of a mesh is used, the unevenness presents almost no problem for practical use. However, it is difficult to apply the suspended metal plate to a large substrate.

The invention has been made to solve the above problem and intends to realize a liquid crystal display device in which a sealing material is formed by screen printing in mass production and a mesh trace is prevented from being created on an alignment film.

In order to overcome the above problem, the invention employs the following specific means.

(1) A liquid crystal display device includes: a TFT substrate at which pixels each including a pixel electrode and a TFT are formed in a matrix shape; a counter substrate at which color filters are formed; and liquid crystal interposed between the TFT substrate and the counter substrate, the TFT substrate and the counter substrate being bonded together via a sealing material formed on a periphery of the counter substrate, wherein at the counter substrate, light shielding films are extended in a first direction and arranged in a second direction which is transverse to the first direction, red color filters are extended in the second direction and arranged in the first direction, blue color filters are extended in the second direction and arranged in the first direction, green color filters are extended in the second direction and arranged in the first direction, color filters of one color among the red color filters, the blue color filters, and the green color filters are extended in the first direction so as to cover the light shielding films, color filters of two layers are formed in portions where the color filters of one color are extended in the first direction, an overcoat film is formed so as to cover the red color filters, the blue color filters, and the green color filters, and an alignment film is formed so as to cover the overcoat film.

(2) The liquid crystal display device according to (1), wherein a difference in height between a portion where the color filters of two layers are formed on the light shielding film and a portion where the light shielding film is not formed is 600 nm or more and 1.8 µm or less.

(3) The liquid crystal display device according to (1), which is an IPS (In-Plane Switching) system liquid crystal display device.

(4) A liquid crystal display device includes: a TFT substrate at which pixels each including a pixel electrode and a TFT are formed in a matrix shape; a counter substrate at which color filters are formed; and liquid crystal interposed between the TFT substrate and the counter substrate, the TFT substrate and the counter substrate being bonded together via a sealing material formed on a periphery of the counter substrate, wherein at the counter substrate, light shielding films are extended in a first direction and arranged in a second direction, red color filters are extended in the second direction and arranged in the first direction, and extended in the first direction and arranged in the second direction so as to cover the light shielding films, blue color filters are extended in the second direction and arranged in the first direction, and extended in the first direction and arranged in the second direction so as to cover the light shielding films, green color filters are extended in the second direction and arranged in the first direction, and extended in the first direction and arranged in the second direction so as to cover the light shielding films, an overcoat film is formed so as to cover the red color filters, the blue color filters, and the green color filters, and an alignment film is formed so as to cover the overcoat film.

(5) The liquid crystal display device according to (4), wherein a difference in height between a portion where the light shielding film is formed and a portion where the light shielding film is not formed is 600 nm or more and 1.8 µm or less.

(6) The liquid crystal display device according to (4), which is an IPS system liquid crystal display device.

According to the invention, since a sealing material with which a TFT substrate and a counter substrate are bonded together is formed by screen printing, the time for the step of forming the sealing material can be greatly reduced. According to the invention, since an alignment film can be prevented from suffering from damage due to the mesh of a screen printing apparatus for forming a sealing material, the occurrence of unevenness on an image due to the mesh can be prevented.

DESCRIPTION OF THE PREFERRED EMBODIMENT

Figure 1:
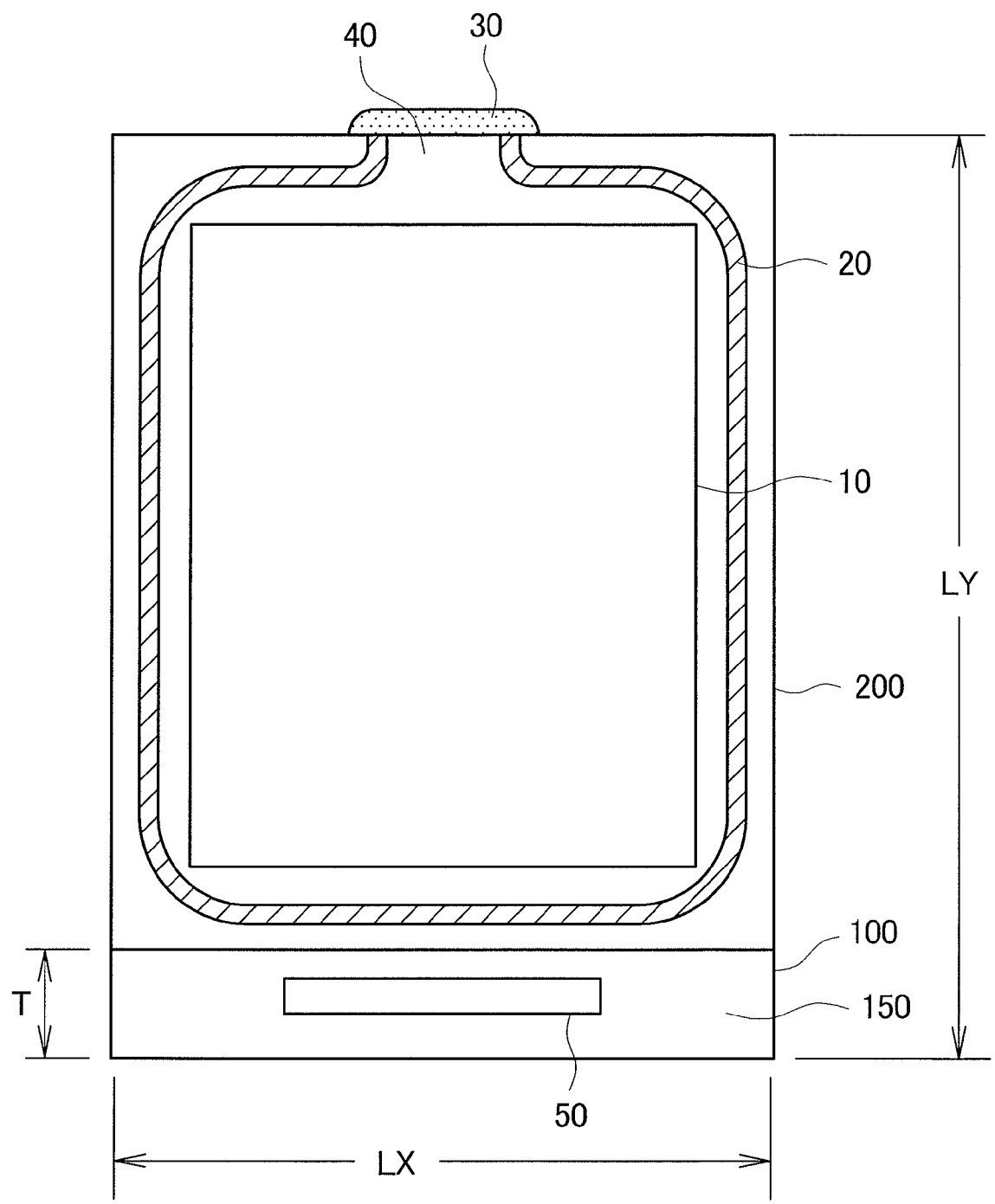
FIG. 1 is a plan view of a liquid crystal display device to which the invention is applied.

FIG. 1 is a plan view of a liquid crystal display device used for a mobile phone or the like, as an example to which the invention is applied.

In FIG. 1, a counter substrate 200 is disposed above a TFT substrate 100. A liquid crystal layer 300 is interposed between the TFT substrate 100 and the counter substrate 200. The TFT substrate 100 and the counter substrate 200 are bonded together with a sealing material 20 formed in a frame portion. The TFT substrate 100 is formed larger than the counter substrate 200. A terminal portion 150 for supplying a liquid crystal cell 1 with power source, video signals, scanning signals, and the like is formed in a portion where the TFT substrate 100 is extended from the counter substrate 200. An IC driver 50 for driving scanning lines, video signal lines, and the like is disposed in the terminal portion 150.

In FIG. 1, a longitudinal diameter LY of the liquid crystal cell 1 is, for example, 81 mm, and a transverse diameter LX thereof is, for example, 54 mm. A width T of the terminal portion 150 on which the IC driver 50 and the like are mounted is 2.7 mm. An area from a display region 10 to the periphery of the TFT substrate 100 or the counter substrate 200 constitutes the frame portion. Not-shown leading wires of the scanning lines and the like are disposed in the frame portion in addition to the sealing material 20.

In FIG. 1, the sealing material 20 is formed of a thermosetting epoxy resin. The sealing material 20 is first applied on the counter substrate 200 by screen printing and overlapped with the TFT substrate 100. After the sealing material 20 is cured by baking, liquid crystal is injected, and an injection hole 40 is sealed with an encapsulating material 30.

Figure 2:
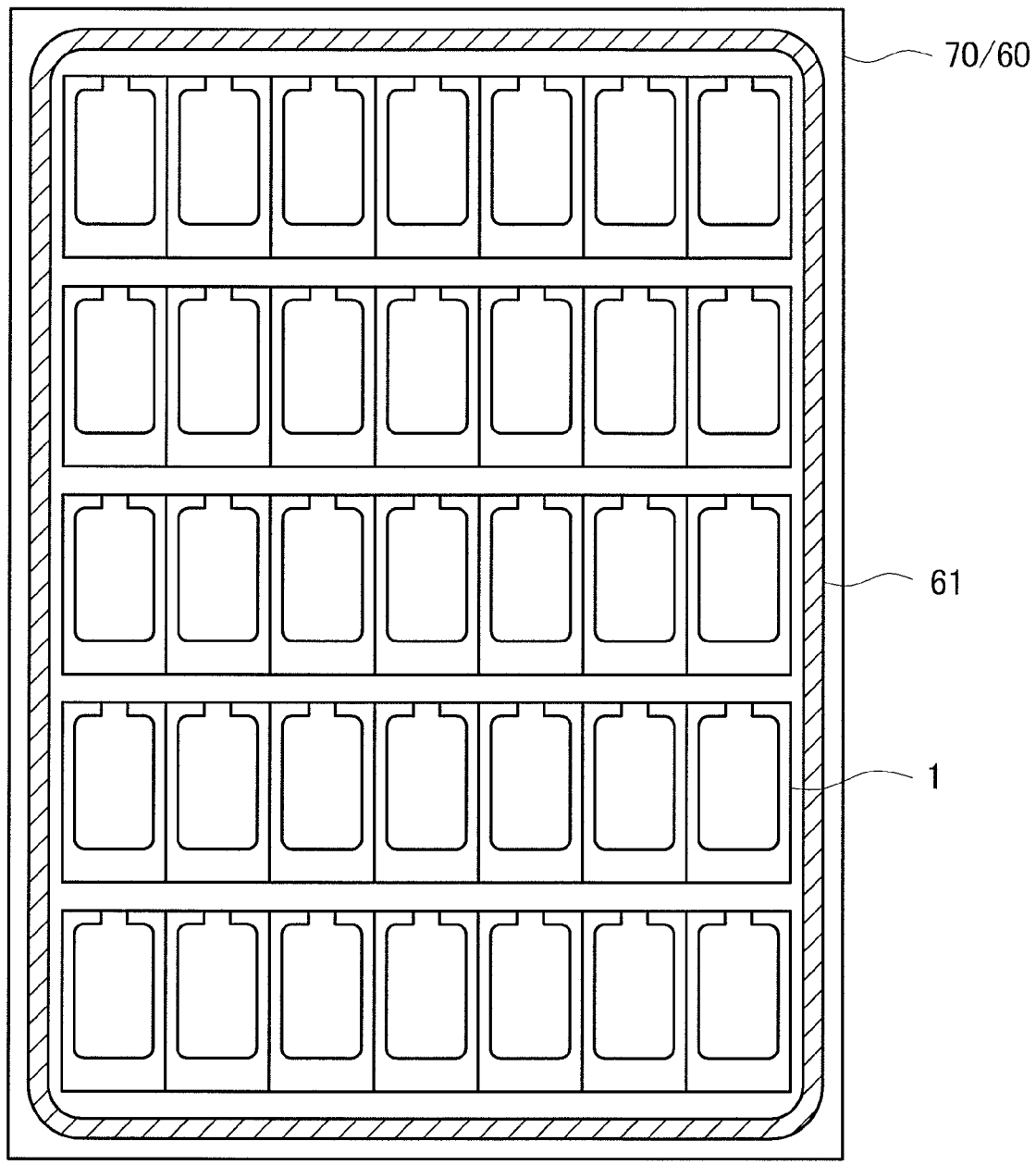
FIG. 2 is a plan view of a mother substrate.

Since the liquid crystal display device shown in FIG. 1 is small, it is inefficient to manufacture the liquid crystal display device one by one. Therefore, plural liquid crystal cells 1 are formed on a large substrate as shown in FIG. 2 and thereafter separated into individual ones. In the specification, a completed display device having the IC driver 50 and the like mounted thereon is called a liquid crystal display device, while one having the TFT substrate 100 and the counter substrate 200 overlapped with each other is called the liquid crystal cell 1.

In FIG. 2, a mother TFT substrate 60 and a mother counter substrate 70 are overlapped with each other via the sealing materials 20 of the individual liquid crystal cells 1 and a mother substrate sealing material 61. The mother substrate sealing material 61 is formed to prevent a polishing solution from entering the inner part when the TFT substrate 100 and the counter substrate 200 are thinned by polishing after the mother substrate is completed. Accordingly, the mother substrate sealing material 61 is unnecessary when there is no need to polish the TFT substrate 100 or the counter substrate 200.

In FIG. 2, the sealing material 20 of each of the liquid crystal cells 1 or the mother substrate sealing material 61 is formed on the mother counter substrate 70 by screen printing. The formation of the sealing material 20 by screen printing is more efficient than the formation of the sealing material 20 by a dispenser, which has been conventionally carried out. As will be described later, however, it is necessary to take measures against unevenness caused by the contact of a mesh upon screen printing.

Figure 3:
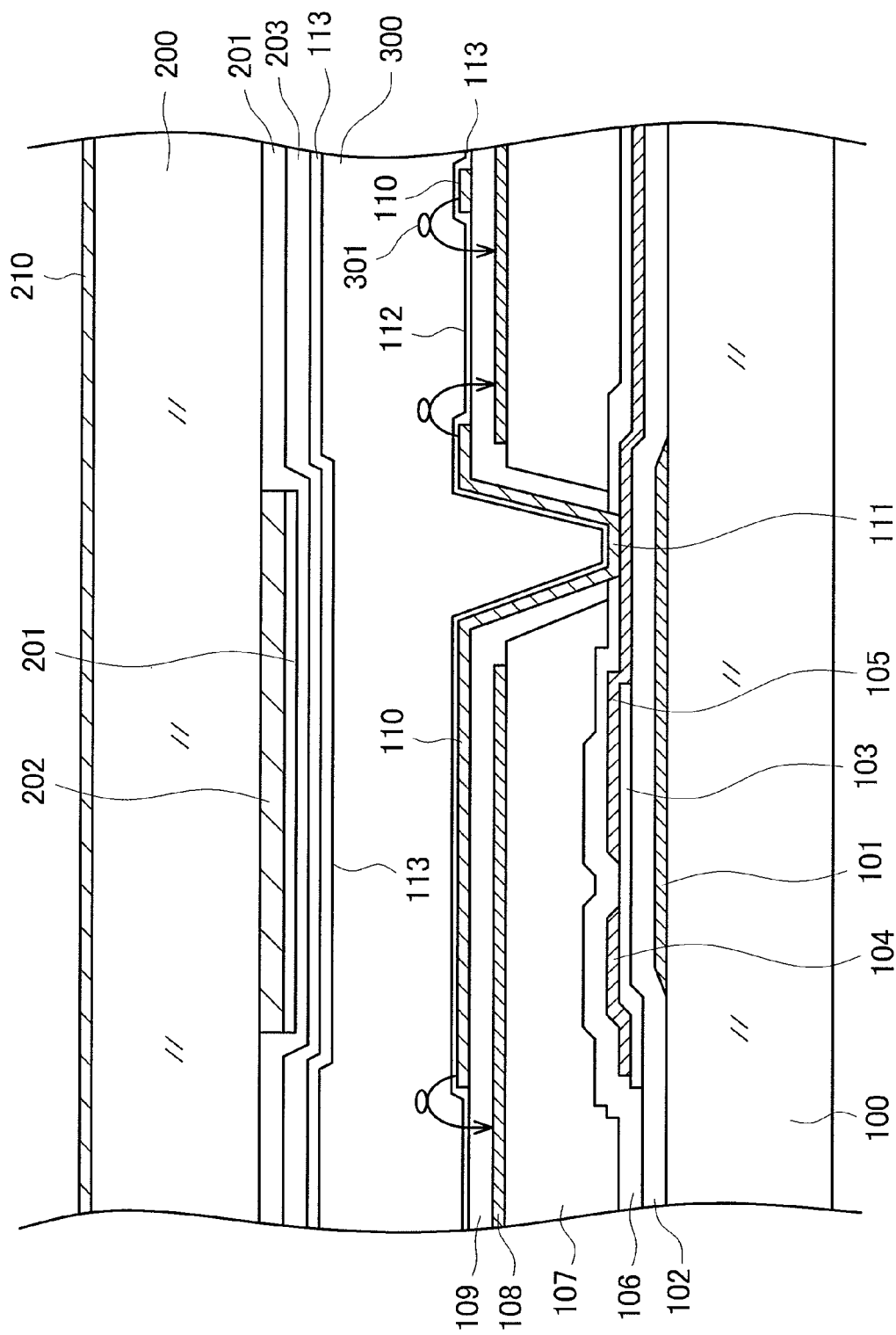
FIG. 3 is a cross sectional view of an IPS system liquid crystal display device.

The invention can be applied to various types of liquid crystal display devices irrespective of the driving method of the liquid crystal display device. In the embodiment, however, an In-Plane Switching (IPS) system liquid crystal display device will be described as an example. FIG. 3 is a cross sectional view of the display region 10 shown in FIG. 1. There are various systems for IPS, and FIG. 3 shows an example among them. FIG. 3 is a cross sectional view in the vicinity of a TFT of the IPS system. In FIG. 3, a gate electrode 101 is formed on the TFT substrate 100 formed of glass. The gate electrode 101 is formed in the same layer as a scanning line. The gate electrode 101 includes a MoCr alloy stacked on an AlNd alloy.

A gate insulating film 102 is formed of SiN so as to cover the gate electrode 101. A semiconductor layer 103 is formed of an a-Si film on the gate insulating film 102 at a position facing the gate electrode 101. The a-Si film is formed by a plasma CVD method. The a-Si film forms a channel portion of the TFT. A source electrode 104 and a drain electrode 105 are formed above the a-Si film with the channel portion interposed therebetween. A not-shown n+Si layer is formed between the a-Si film and the source electrode 104 or the drain electrode 105. This is in order to establish an ohmic contact between the semiconductor layer and the source electrode 104 or the drain electrode 105.

The source electrode 104 is also used by a video signal line. The drain electrode 105 is connected to a pixel electrode 110. The source electrode 104 and the drain electrode 105 are formed simultaneously in the same layer. In the embodiment, the source electrode 104 or the drain electrode 105 is formed of a MoCr alloy. When it is intended to reduce the electrical resistance of the source electrode 104 or the drain electrode 105, an electrode structure in which an AlNd alloy is sandwiched between MoCr alloys is used, for example.

An inorganic passivation film 106 is formed of SiN so as to cover the TFT. The inorganic passivation film 106 protects especially the channel portion of the TFT against impurities. An organic passivation film 107 is formed on the inorganic passivation film 106. The organic passivation film 107 is formed thick because the film serves to protect the TFT as well as planarize the surface. The thickness of the film is from 1 μm to 4 μm.

A photosensitive acrylic resin, silicone resin, polyimide resin, or the like is used for the organic passivation film 107. A through hole has to be formed through the organic passivation film 107 at a portion where the pixel electrode 110 and the drain electrode 105 are connected to each other. Since the organic passivation film 107 is photosensitive, the organic passivation film 107 itself can be exposed and developed to form the through hole without using a photoresist.

A counter electrode 108 is formed on the organic passivation film 107. The counter electrode 108 is formed by sputtering Indium Tin Oxide (ITO) which serves as a transparent conductive film on the entire display region 10. That is, the counter electrode 108 is formed into a plane. After the counter electrode 108 is formed on the entire surface by sputtering, the counter electrode 108 is removed by etching only at the through hole portion for electrically conducting the pixel electrode 110 to the drain electrode 105.

An upper insulating film 109 is formed of SiN so as to cover the counter electrode 108. After the upper insulating film is formed, a through hole is formed by etching. The inorganic passivation film 106 is etched using the upper insulating film 109 as a resist to form a through hole 111. Thereafter, an ITO film serving as the pixel electrode 110 is formed by sputtering so as to cover the upper insulating film 109 and the through hole 111. The sputtered ITO film is patterned to form the pixel electrode 110. The ITO film serving as the pixel electrode 110 is also coated on the through hole 111. In the through hole 111, the drain electrode 105 extended from the TFT is electrically conducted to the pixel electrode 110, whereby a video signal is supplied to the pixel electrode 110.

The pixel electrode 110 includes comb-tooth electrodes which are closed at both ends. A slit 112 is formed between the comb-tooth electrodes. A constant voltage is applied to the counter electrode 108, while a voltage due to a video signal is applied to the pixel electrode 110. When the voltage is applied to the pixel electrode 110, lines of electric force are generated to rotate liquid crystal molecules 301 in directions of the lines of electric force as shown in FIG. 3. As a result, transmission of light from a backlight is controlled. The transmission from a backlight is controlled for each pixel, whereby an image is formed. An alignment film 113 is formed on the pixel electrode 110 for aligning the liquid crystal molecules 301.

In the example of FIG. 3, the counter electrode 108 which is formed into a plane is disposed on the organic passivation film 107, and the comb-tooth electrode 110 is disposed on the upper insulating film 109. Contrary to this, however, the pixel electrode 110 which is formed into a plane may be disposed on the organic passivation film 107, and the counter electrode 108 having a comb-tooth shape may be disposed on the upper insulating film 109.

In FIG. 3, the counter substrate 200 is disposed with the liquid crystal layer 300 interposed between the counter substrate 200 and the TFT substrate 100. Color filters 201 are formed on the inner side of the counter substrate 200. The color filters 201 of red, green, and blue are formed for each pixel, whereby a color image is formed. A light shielding film 202 is formed between the color filters 201, which improves the contrast of image. The light shielding film 202 also serves as the light shielding film 202 of the TFT for preventing photocurrent from flowing into the TFT.

In the invention, the color filters 201 of two layers are formed also on the light shielding film 202. This is in order to prevent the occurrence of image unevenness caused by a mesh for screen printing contacting the alignment film 113 in the pixel region to damage the alignment film 113 upon forming the sealing material 20 by screen printing, as will be described in detail later.

An overcoat film 203 is formed so as to cover the color filter 201 and the light shielding film 202. The overcoat film 203 has two roles: one is to prevent a color filter material from contaminating the liquid crystal layer 300, and the other is to reduce excessive irregularities on the surface of the color filter 201. The alignment film 113 for determining an initial alignment of liquid crystal is formed on the overcoat film 203.

In the IPS system, a so-called tilt angle on the surface of the alignment film is small. When the so-called tilt angle on the surface of the alignment film is small, the contact of a mesh with the display region of the counter substrate largely influences image unevenness in screen printing which will be described later. Accordingly, the invention which reduces the influence has an advantage especially in IPS system liquid crystal display devices.

Since FIG. 3 shows the IPS system liquid crystal display device, the counter electrode is formed on the side of the TFT substrate 100 but not formed on the side of the counter substrate 200. In this manner, a conductive film is not formed on the inner side of the counter substrate 200 in the IPS system. Therefore, the potential of the counter substrate 200 becomes unstable. In addition, electromagnetic noise from the outside enters the liquid crystal layer 300 to exert an influence on an image. In order to eliminate the problems, a surface conductive film 210 is formed on the outer surface of the counter substrate 200. The surface conductive film 210 is formed by sputtering ITO which serves as a transparent conductive film.

Figure 9A:
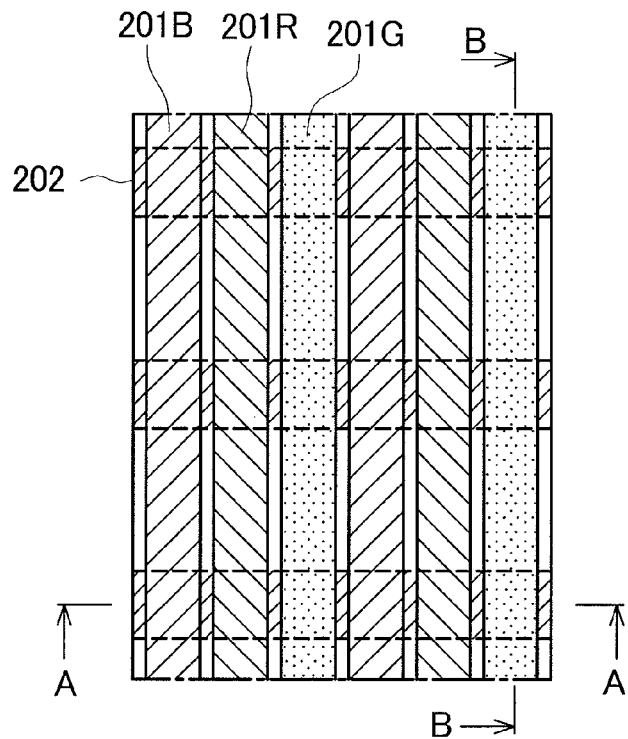
FIGS. 9A to 9C are explanatory views of a conventional example.
Figure 9B:
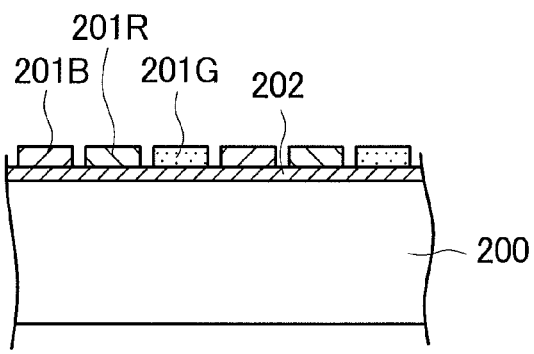
Figure 9C:
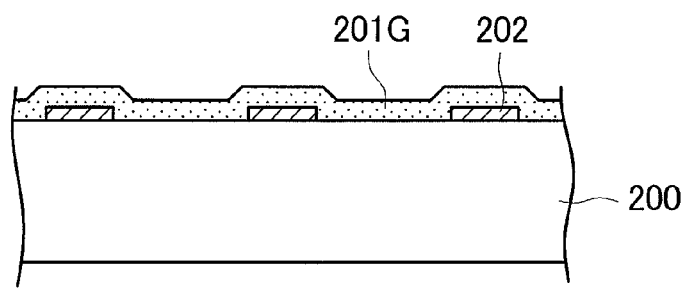

When a mesh for screen printing contacts the alignment film 113 above the color filter 201 formed in the display region 10 upon forming the sealing material 20 by screen printing, the alignment film 113 is affected in that contact portion, resulting in the occurrence of unevenness. FIGS. 9A to 9C show a pixel configuration in a conventional counter substrate 200, in which FIG. 9A is a plan view thereof.

In FIG. 9A, the light shielding films 202 are formed in a stripe shape in the horizontal direction at the same pitches as the scanning lines of the TFT substrate 100. The light shielding film 202 serves to protect the TFT formed above the scanning line or in the vicinity of the scanning line against an external light. Red color filters 201R, blue color filters 201B, and green color filters 201G are formed in a stripe shape in the vertical direction on the light shielding films 202 at specific intervals. The color filters 201 are formed in the order of, for example, the red color filter 201R, the blue color filter 201B, and the green color filter 201G.

FIG. 9B is an A-A cross sectional view in FIG. 9A. FIG. 9B shows a cross section of a portion where the color filters 201 are formed so as to overlap the light shielding film 202. FIG. 9C is a B-B cross sectional view in FIG. 9A. The B-B cross sectional view shows a cross section along the green color filter 201G. In FIG. 9C, since the green color filter 201G is formed so as to partially cover the light shielding films 202, the covered portions are higher in level than the other portions. As a result, differences in level are formed. Since the thickness of the light shielding film 202 is, for example, 1.2 μm, differences in level of each about 1.2 μm are formed in this state.

Figure 10:
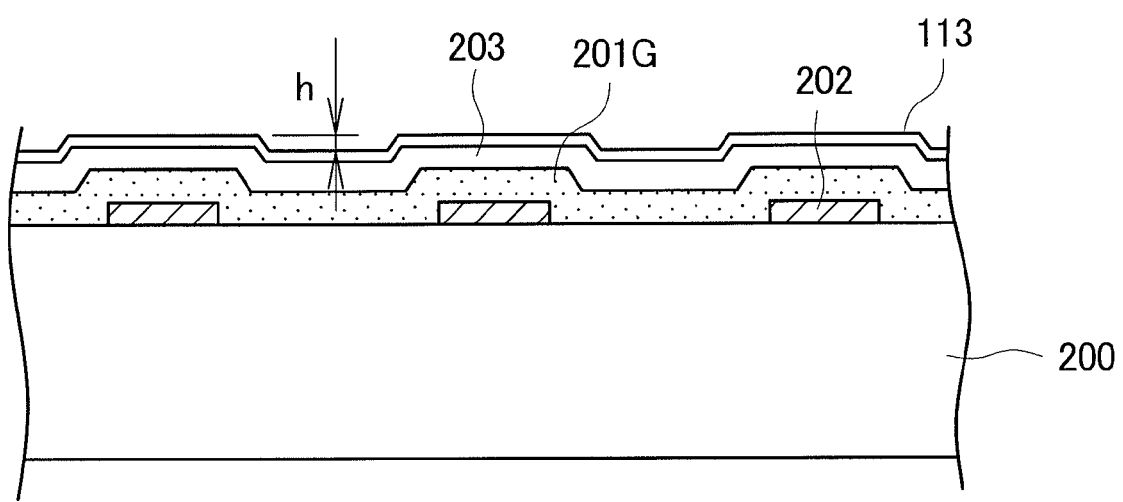
FIG. 10 is a cross sectional view of the conventional example.

FIGS. 9A to 9C show a state where the overcoat film 203 is not formed. Contrary to FIGS. 9A to 9C, FIG. 10 is a cross sectional view showing a state where the overcoat film 203 is formed. When the overcoat film 203 is formed, the difference in level between the portion above the light shielding film 202 and the other portion is reduced. The alignment film 113 is further formed on the overcoat film 203. In FIG. 10, a difference h in level between the portion above the light shielding film 202 and the other portion is about 96 nm.

Since the thickness of the alignment film 113 is small, the overcoat film 203 dominantly influences the difference in level. That is, the difference h in level in this case changes also depending on the thickness of the overcoat film 203. That is, the difference in level becomes smaller as the thickness of the overcoat film 203 is greater. The difference in level in FIG. 10 is a difference in level when the light shielding film 202 is formed so that the thickness of the overcoat film 203 above the light shielding film 202 is about 1.5 μm.

A cross section of the display region 10 when the sealing material 20 is formed above the counter substrate 200 is in the state shown in FIG. 10. When the sealing material 20 is formed by screen printing, the mesh for screen printing contacts an effective surface. There is no influence on an image when the mesh contacts the alignment film 113 above the light shielding film 202. However, when the mesh contacts the alignment film 113 at a portion not formed with the light shielding film 202, image unevenness occurs. In the configuration in FIG. 10, a difference in level of about 96 nm is present between the portion formed with the light shielding film 202 and the other portion. However, such a difference in level cannot prevent image unevenness because the mesh contacts both the portion above the light shielding film 202 and the other portion. In this case, the occurrence rate of unevenness due to the influence of the mesh in screen printing is 13.9%.

The invention intends to prevent image unevenness due to the mesh of a screen printing apparatus by configuring the counter substrate 200 like embodiments shown below.

[First Embodiment]

Figure 4A:
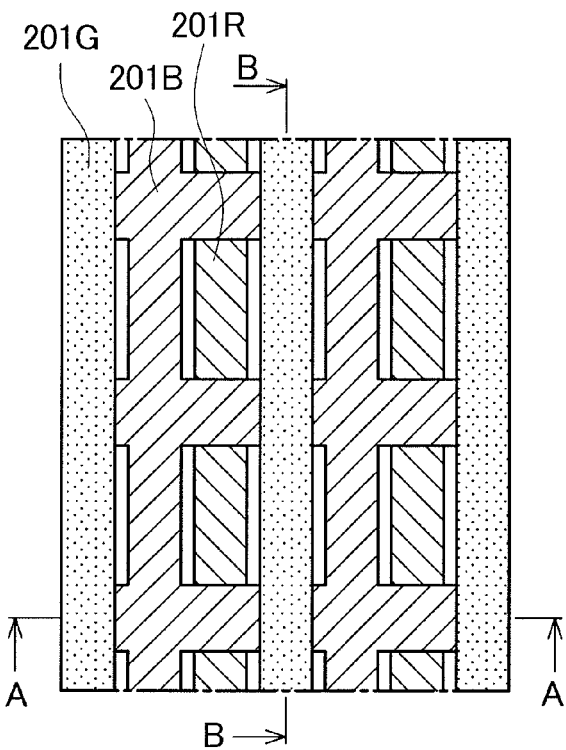
FIGS. 4A to 4C are explanatory views of a first embodiment.
Figure 4B:
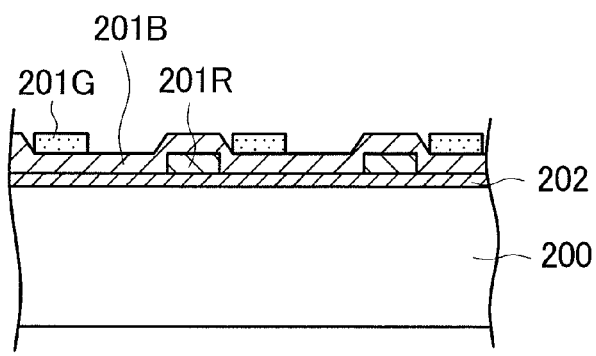
Figure 4C:
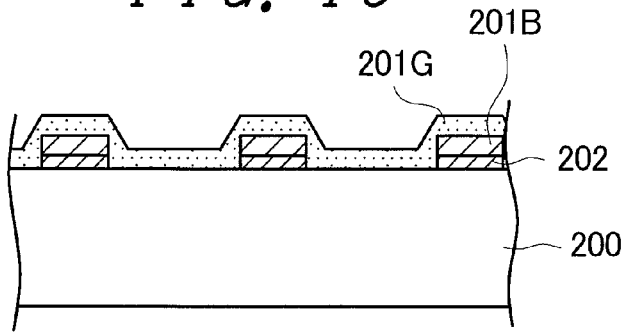

FIGS. 4A to 4C show the configuration of the display region 10 of the counter substrate 200, showing a first embodiment of the invention. FIG. 4A is a plan view of the pixel configuration of the display region 10. FIG. 4B is an A-A cross sectional view in FIG. 4A. FIG. 4C is a B-B cross sectional view in FIG. 4A. In FIG. 4A, the red color filters 201R, the blue color filters 201B, and the green color filters 201G extend in the vertical direction at predetermined intervals. In FIGS. 4A to 4C, the color filters 201 are formed in the order of the red color filter 201R, the blue color filter 201B, and the green color filter 201G.

The blue color filters 201B extend not only in the vertical direction but also in the horizontal direction so as to cover the light shielding films 202 which extend in the horizontal direction. Accordingly, the blue color filter 201B and the red color filter 201R, or the blue color filter 201B and the green color filter 201G are overlapped with each other on the light shielding film 202. That is, in the red color filter 201R and the green color filter 201G, the level of the portion above the light shielding film 202 is higher compared with that of the portion not formed with the light shielding film 202 by the thickness of the light shielding film 202 and the thickness of the blue color filter.

FIG. 4B is the A-A cross sectional view in FIG. 4A. FIG. 4B is the cross sectional view along the light shielding film 202 which extends in the horizontal direction. As shown in FIG. 4B, the color filters of two layers are formed on the light shielding film 202 at portions where the red color filter 201R and the green color filter 201G are formed. On the other hand, at the portion of the blue color filter 201B, only one layer of the blue color filter 201B is formed on the light shielding film 202.

FIG. 4C is a B-B cross sectional view in FIG. 4A. FIG. 4C is the cross sectional view along the green color filter 201G. The thickness of the color filter 201 is, for example, about 3 μm. The thickness of the light shielding film 202 is, for example, 1.3 μm. Accordingly, in the green color filter 201G, a difference in level of 4.3 μm is formed between the portion above the light shielding film 202 and the other portion. The same state applies to the red color filter 201R.

Figure 5:
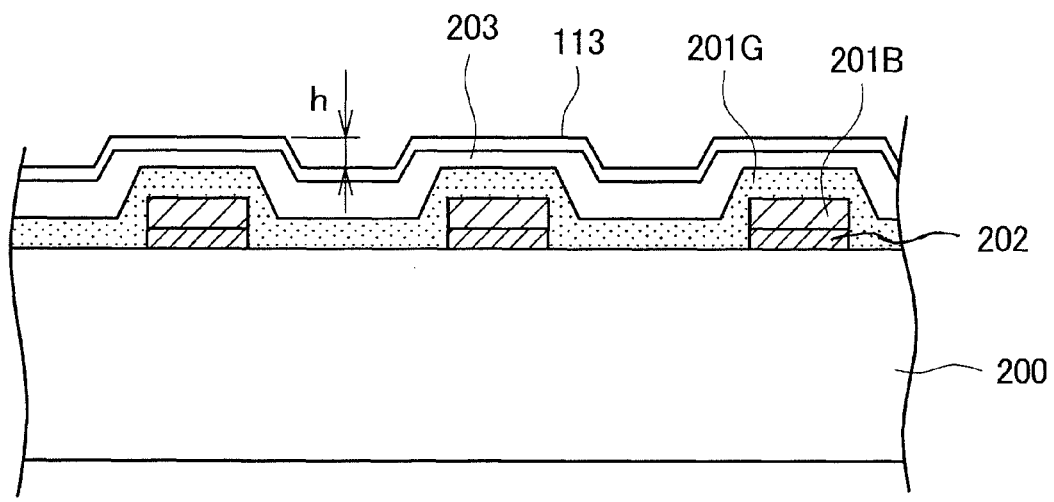
FIG. 5 is a cross sectional view of the first embodiment.

In an actual product, the overcoat film 203 is formed on the color filter 201, and the alignment film 113 is further formed thereon. This state is shown in FIG. 5. Since the thickness of the alignment film 113 is small, the overcoat film 203 dominantly influences the difference h in level in FIG. 5.

In FIG. 5, when the overcoat film 203 is formed so as to have a thickness of, for example, about 1.5 μm above the light shielding film 202, the difference h in level in FIG. 5 is about 409 nm. Although FIG. 5 shows the difference in level above the green color filter 201G, the same state applies to the red color filter 201R. On the other hand, a difference in level above the blue color filter 201B is the same as in the past.

When the sealing material 20 is formed by screen printing for the counter substrate 200 in such a state, the occurrence rate of image unevenness due to the mesh of a screen printing apparatus is about 9.7%. This value represents a significant improvement over the value of 13.9% in the conventional example but is still insufficient.

Contrary to this, when the thickness of the overcoat film 203 above the light shielding film 202 in FIG. 5 is formed as thin as about 1 m, the difference h in level in FIG. 5 is increased to be about 750 nm. When the sealing material 20 is formed by screen printing for the counter substrate 200 in such a state, the occurrence rate of image unevenness due to the mesh of a screen printing apparatus is zero.

That is, since the height of the light shielding film 202 portion is remarkably greater than that of the other portion, the mesh of a screen printing apparatus is supported by the light shielding film 202 portion. As a result, the color filter 201 in the portion not formed with the light shielding film 202, that is, the portion for forming an image can be prevented from contacting the mesh and suffering from the damage.

In the embodiment, only the difference h in level along the red color filter 201R and the difference h in level along the green color filter 201G are large, and the difference h in level along the blue color filter 201B is the same as in the past. However, since the higher portions of the red color filter 201R and the green color filter 201G serve as stoppers for the mesh in screen printing, damage to the blue color filter 201B can also be prevented.

In the same manner, when the influence of the mesh of a screen printing apparatus on an image is investigated by forming the color filters 201 of two layers on the light shielding film 202 and changing the thickness of the overcoat film 203, it is found that a difference h in level in FIG. 5 of 600 nm or more can eliminate the influence of the mesh on image unevenness.

The TFT substrate 100 and the counter substrate 200 are arranged at a specific interval for interposing liquid crystal therebetween. The specific interval is generally maintained by a spacer on color filter (SOC) 205 formed above the counter substrate 200. The SOC 205 is formed by exposing and developing a photosensitive acrylic resin or the like.

Figure 6A:
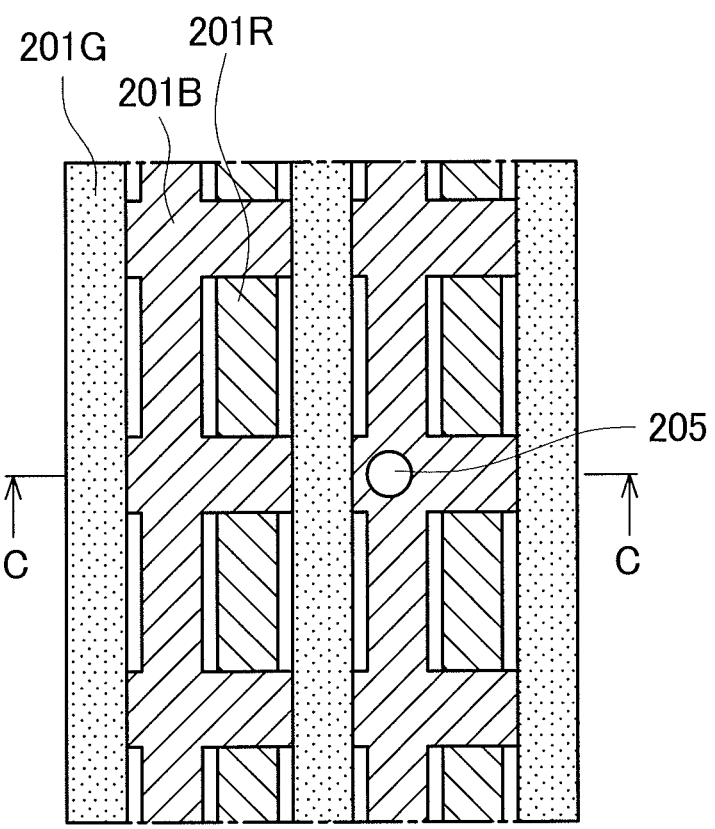
FIGS. 6A and 6B are other explanatory views of the first embodiment.
Figure 6B:
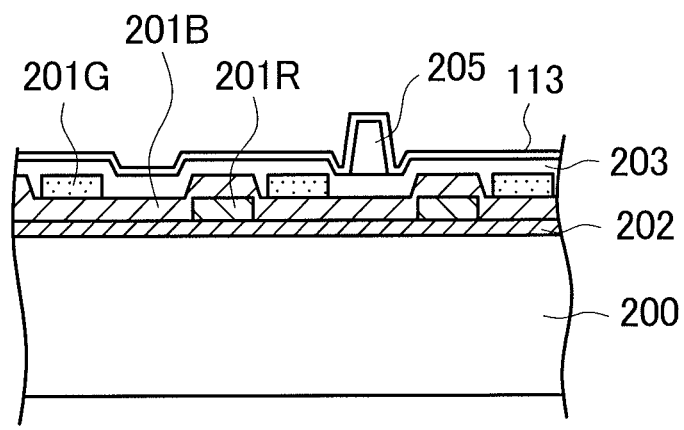

FIG. 6A is a plan view showing a state where the SOC 205 is formed above the counter substrate 200. FIG. 6B is a C-C cross sectional view in FIG. 6A. As shown in FIGS. 6A and 6B, the SOC 205 is formed on the overcoat film 203 above the blue color filter 201B and above the light shielding film 202. The height of the SOC 205 is, for example, about 3.5 μm.

It is obvious that the difference h in level shown in FIG. 5 or FIG. 6B should not exceed 3.5 μm. Further, when the difference h in level is close to the height of the SOC 205, the alignment disturbance of liquid crystal is remarkable. According to an experiment, remarkable alignment disturbance is not observed as long as the difference h in level is up to 1.8 μm which is about half the height of the SOC 205.

As described above, the difference h in level in FIG. 5 or FIG. 6B is set to 600 nm or more and 1.8 μm or less, whereby unevenness due to a mesh at the time of forming the sealing material 20 by screen printing can be suppressed.

In the embodiment, the color filters 201 are manufactured in the order of the red color filter 201R, the blue color filter 201B, and the green color filter 201G. However, the manufacturing order of the color filters is not necessarily limited thereto. Also in the embodiment, the color filter 201 which extends in the same direction as the light shielding film 202 to cover the light shielding film 202 is the blue color filter 201B. However, the invention is not limited thereto. The color filter of another color may extend in the same direction as the light shielding film 202 so as to cover the light shielding film 202 in accordance with the change in manufacturing order of the color filters 201.

[Second Embodiment]

Figure 7A:
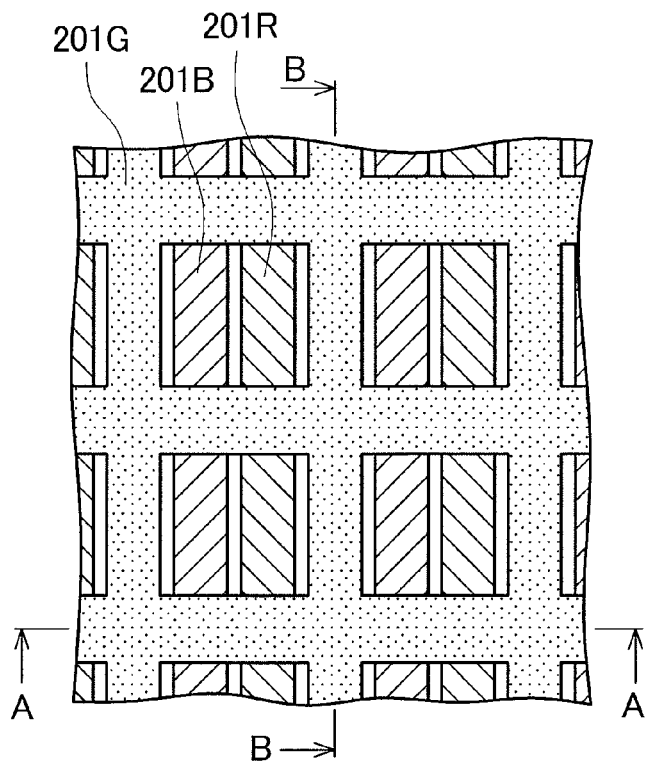
FIGS. 7A to 7C are explanatory views of a second embodiment.
Figure 7B:
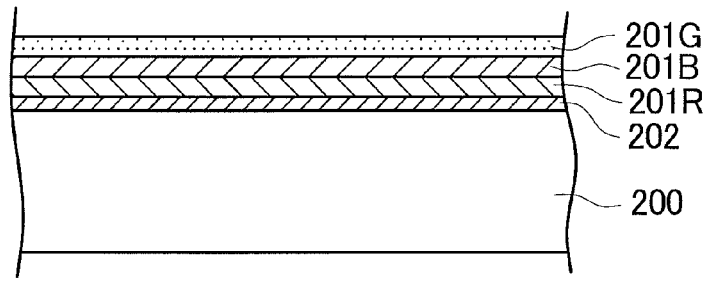
Figure 7C:
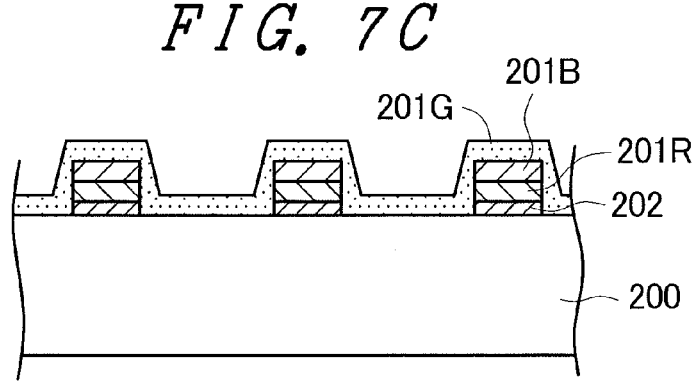

FIGS. 7A to 7C show the pixel configuration of the counter substrate 200 showing a second embodiment of the invention. FIG. 7A is a plan view showing the configuration of the embodiment. FIG. 7B is an A-A cross sectional view in FIG. 7A. FIG. 7C is a B-B cross sectional view in FIG. 7A. In FIG. 7A, the red color filters 201R, the blue color filters 201B, and the green color filters 201G extend in the vertical direction. The respective color filters extend not only in the vertical direction but also in the horizontal direction at specific pitches. In FIG. 7A, only the green color filters 201G seem to extend also in the horizontal direction. However, also the blue color filters 201B and the red color filters 201R extend in the horizontal direction under the green color filters 201G. Although the light shielding films 202 extend in the horizontal direction at specific pitches, the light shielding films 202 are not shown in FIG. 7A because they are covered with the green color filters 201G.

FIG. 7B is the A-A cross sectional view in FIG. 7A, showing the cross section along the light shielding film 202. As shown in FIG. 7B, the color filters 201 of three layers of the red color filter 201R, the blue color filter 201B, and the green color filter 201G are formed on the light shielding film 202.

FIG. 7C is the B-B cross sectional view in FIG. 7A, showing the cross sectional structure along the green color filter 201G. As shown in FIG. 7C, the color filters 201 of three layers are overlapped with one another on the light shielding film 202. The thickness of the light shielding film 202 is 1.3 μm, and the thickness of each of the color filters 201 is about 3 μm. Accordingly, a large difference in level of 7.3 μm is present between the portion above the light shielding film 202 and the other portion.

Figure 8:
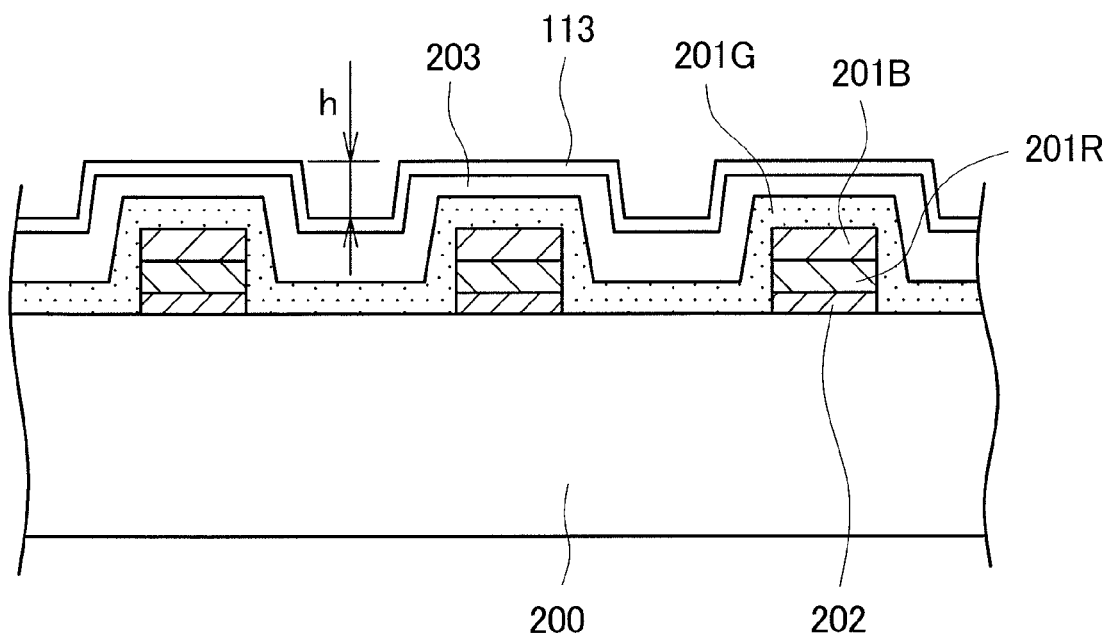
FIG. 8 is a cross sectional view of the second embodiment.

In an actual product, the overcoat film 203 and the alignment film 113 are formed on the green color filter 201G as shown in FIG. 8. Although the large difference in level of 7.3 μm is formed before the formation of the overcoat film 203, the difference h in level is reduced after the formation of the overcoat film 203 and the alignment film 113.

However, since the difference in level before the formation of the overcoat film 203 is originally large, the difference h in level shown in FIG. 8 can easily be 600 nm or more even when the overcoat film 203 is formed to a thickness of about 1.5 μm above the light shielding film 202. On the other hand, the difference h in level in FIG. 8 should be 1.8 μm or less in the same manner as the first embodiment because of the limitation in view of alignment disturbance.

As described above, according to the embodiment, the difference h in level between the portion above the light shielding film 202 and the other portion can easily be 600 nm or more. Therefore, it is possible to prevent unevenness due to the influence of the mesh upon forming the sealing material 20 by screen printing.

That is, a convex formed by overlapping the color filters of three layers on the light shielding film serves as a stopper for the mesh in screen printing, whereby the mesh can be prevented from contacting the alignment film in the portion not formed with the light shielding film, that is, in the pixel region.

In the embodiment, the color filters 201 are manufactured in the order of the red color filter 201R, the blue color filter 201B, and the green color filter 201G. However, the order is not necessarily limited thereto. This is because the fact that the color filters of three layers are formed on the light shielding film is still unchanged even when the order of forming the color filters varies.

The light shielding film can also be formed of a metal such as chromium in addition to a resin. Although the light shielding film is formed in a stripe shape in the horizontal direction in the specification, it can be formed in a matrix shape so as to also cover the boundaries between the color filters in the vertical direction. Further, although the overcoat film is disposed on the color filter in the specification, the invention can be configured with no overcoat film when the contamination of the liquid crystal layer due to pigments of the color filters presents no problem. In this case, the advantage of preventing the mesh from contacting the alignment film in the pixel region is enhanced because of the configuration of the invention.

Further, the thicknesses of the color filters of RGB can be varied for improving the display performance. For example, the thickness of the blue color filter can be less than those of the red and green color filters. In this case, the color filter formed into a mesh shape in the embodiment in FIGS. 4A to 4C and 6A and 6B is the red color filter or the green color filter, whereby the height of the convex formed by stacking the color filters can be increased.

Further, although the SOC is formed on the blue color filter in FIG. 6, the SOC may be formed on a portion where the color filters are stacked in two layers or three layers.

The above embodiments have described the IPS system liquid crystal display device. However, the invention is not limited to the IPS system liquid crystal display device and can be applied to other liquid crystal display devices such as of TN system or VA system.

What is claimed is:
1. A liquid crystal display device comprising:
a TFT (Thin Film Transistor) substrate at which pixels each including a pixel electrode and a TFT are formed in a matrix shape; a counter substrate at which color filters are formed; and liquid crystal interposed between the TFT substrate and the counter substrate, the TFT sub- strate and the counter substrate being bonded together via a sealing material formed on a periphery of the counter substrate, wherein at the counter substrate, light shielding films are extended in a first direction and arranged in a second direction which is transverse to the first direction, red color filters are extended in the second direction and arranged in the first direction, blue color filters are extended in the second direction and arranged in the first direction, green color filters are extended in the second direction and arranged in the first direction, color filters of one color among the red color filters, the blue color filters, and the green color filters are also extended in the first direction so as to cover the light shielding films, color filters of another color are formed in portions where the color filters of one color are extended in the first direction so as to provide color filters of two layers of one layer of color filters of the one color and another layer of the another color, and an overcoat film is formed so as to cover the red color filters, the blue color filters, and the green color filters, and an alignment film is formed so as to cover the overcoat film.

2. The liquid crystal display device according to claim 1, wherein a difference in height between a portion where the color filters of two layers are formed on the light shielding film and a portion where the light shielding film is not formed is 600 nm or more and 1.8 μm or less.

3. The liquid crystal display device according to claim 1, which is an IPS (In-Plane Switching) system liquid crystal display device.

4. A liquid crystal display device comprising:

a TFT (Thin Film Transistor) substrate at which pixels each including a pixel electrode and a TFT are formed in a matrix shape; a counter substrate at which color filters are formed; and liquid crystal interposed between the TFT substrate and the counter substrate, the TFT substrate and the counter substrate being bonded together via a sealing material formed on a periphery of the counter substrate, wherein at the counter substrate, light shielding films are extended in a first direction and arranged in a second direction, red color filters are extended in the second direction and arranged in the first direction which is transverse to the first direction, and extended in the first direction and arranged in the second direction so as to cover the light shielding films, blue color filters are extended in the second direction and arranged in the first direction, and extended in the first direction and arranged in the second direction so as to cover the light shielding films, green color filters are extended in the second direction and arranged in the first direction, and extended in the first direction and arranged in the second direction so as to cover the light shielding films, and an overcoat film is formed so as to cover the red color filters, the blue color filters, and the green color filters, and an alignment film is formed so as to cover the overcoat film.

5. The liquid crystal display device according to claim 4, wherein a difference in height between a portion where the light shielding film is formed and a portion where the light shielding film is not formed is 600 nm or more and 1.8 μm or less.

6. The liquid crystal display device according to claim 4, which is an IPS (In-Plane Switching) system liquid crystal display device.

* * * * *